(12) United States Patent
Simons

(10) Patent No.: US 8,382,937 B2
(45) Date of Patent: Feb. 26, 2013

(54) LAMINATING ADHESIVES BASED ON TRIGLYCERIDE-DERIVED POLYOLS

(75) Inventor: J. Brandon Simons, Raleigh, NC (US)

(73) Assignee: Henkel Corporation, Rocky Hill, CT (US)

(*) Notice: Subject to any disclaimer, the term of this patent is extended or adjusted under 35 U.S.C. 154(b) by 1271 days.

(21) Appl. No.: 11/057,877

(22) Filed: Feb. 14, 2005

(65) Prior Publication Data

US 2006/0182957 A1 Aug. 17, 2006

(51) Int. Cl.
C09J 5/02 (2006.01)
(52) U.S. Cl. .................. 156/331.7; 156/308.6
(58) Field of Classification Search ............ 428/423.1; 521/155; 156/331.7, 308.6
See application file for complete search history.

(56) References Cited

U.S. PATENT DOCUMENTS

| 6,353,078 | B1 | 3/2002 | Murata et al. | |
| 6,359,023 | B1 | 3/2002 | Kluth et al. | |
| 6,482,523 | B1 | 11/2002 | Morikawa et al. | |
| 6,610,811 | B1* | 8/2003 | Westfechtel et al. | 528/44 |
| 6,617,031 | B1 | 9/2003 | Glasbrenner | |
| 6,833,044 | B2 | 12/2004 | Imai et al. | |
| 6,833,463 | B2* | 12/2004 | Halpern et al. | 554/169 |
| 2002/0157789 | A1* | 10/2002 | Imai et al. | 156/331.7 |
| 2004/0140055 | A1* | 7/2004 | Chen et al. | 156/355 |

FOREIGN PATENT DOCUMENTS

EP 1 058 701 B1 1/2004

* cited by examiner

Primary Examiner — James J Seidleck
Assistant Examiner — Peter A Salamon
(74) Attorney, Agent, or Firm — James E. Piotrowski; Steven C. Bauman

(57) ABSTRACT

Natural oils, fats and other fatty acid triglycerides are transesterified with polyalcohols such as trimethylolpropane or glycerol to yield polyhydroxyl-functionalized reaction products which are useful materials in the formulation of two component laminating adhesives.

17 Claims, No Drawings

LAMINATING ADHESIVES BASED ON TRIGLYCERIDE-DERIVED POLYOLS

FIELD OF THE INVENTION

The present invention provides two component laminating adhesives based on polyurethanes in which at least one of the two components contains a polyhydroxyl-functionalized transesterification product obtained by reacting a polyalcohol with a fatty acid triglyceride such as a natural fat or oil or a derivative of such polyhydroxyl-functionalized transesterification product (e.g., a polyester or isocyanate- or hydroxyl-functionalized prepolymer based on such transesterification product). The two components are combined and the resulting adhesive used to laminate a thin polymeric film or foil to one or more thin polymeric films or foils.

BACKGROUND OF THE INVENTION

Laminating adhesives are widely used in the manufacture of film/foil laminates. Among many such known systems, the use of polyurethane based laminating adhesives is preferred because of their many desirable properties including good adhesion, peel strength, heat seal strength and resistance to aggressive filling goods. Typically, an isocyanate-containing polyurethane prepolymer obtained by the reaction of excess diisocyanate with a polyether and/or polyester containing two or more active hydrogen groups per molecule is used in combination with a second component. The second component usually is a polyether and/or polyester functionalized with two or more hydroxyl groups or the like per molecule. The two components are combined in a predetermined ratio and applied on one of the film or foil substrates and laminated to the second substrate. Application may be from a solution in a suitable solvent using gravure or smooth roll coating cylinders or from a solvent-free state using special application machinery.

SUMMARY OF THE INVENTION

The present invention provides a two component laminating adhesive comprising Component A and Component B, wherein Component A comprises an isocyanate-functionalized compound and Component B comprises an active hydrogen-functionalized compound. At least one of either Component A or Component B comprises at least one of a polyhydroxyl-functionalized transesterification product, a polyhydroxyl-functionalized polyester derived from said polyhydroxyl-functionalized transesterification product, or a polyisocyanate-functionalized or hydroxyl-functionalized urethane prepolymer derived from said polyhydroxyl-functionalized transesterification product or said polyhydroxyl-functionalized polyester. The polyhydroxyl-functionalized transesterification product is obtained by a process comprising transesterifying at least one polyalcohol containing at least three hydroxyl groups per molecule with at least one fatty acid triglyceride. Optionally, the initial product obtained from tranesterification may be partially esterified with a free fatty acid. The fatty acid triglyceride may be a natural fat or oil or a natural fat or oil that has been modified (for example, by hydrogenation). The utilization of starting materials obtained from renewable resources allows two component laminating adhesives to be formulated so as to reduce or avoid the use of conventional polyols and other components derived from petrochemicals. At the same time, the laminating adhesives of the present invention provide good adhesive performance, especially in the lamination of flexible films.

A laminate may be formed by combining the two components to provide an adhesive and then using the adhesive to adhere one polymeric film or metallic foil to another polymeric film or metallic foil. The adhesive layer between the film or foil layers of the laminate is then cured to provide a strong adhesive bond.

DETAILED DESCRIPTION OF CERTAIN EMBODIMENTS OF THE INVENTION

The polyhydroxyl-functionalized transesterification product utilized as a constituent of the laminating adhesive of the present invention or utilized as a starting material or intermediary for other materials useful in said laminating adhesive is obtained by a process comprising transesterifying at least one polyalcohol containing at least three hydroxyl groups per molecule with at least one fatty acid triglyceride.

Suitable polyalcohols include compounds bearing at least three hydroxyl (—OH) functional groups per molecule. For example, the polyalcohol may contain three to five hydroxyl groups per molecule. Preferably, the hydroxyl groups are primary and/or secondary. The polyalcohol may be aliphatic or aromatic in character, with polyalcohols derived from natural and/or renewable sources being preferred in one embodiment of the invention. Illustrative polyalcohols which may be used in the present invention include glycerin, trimethylolpropane, pentaerythritol, trimethylolethane, 1,2,6-hexanetriol, 1,2,4-butanetriol, sugar alcohols (e.g, sorbitol), alkyl glucosides, and sugars (e.g., glucose, lactose, fructose) and the like. In one embodiment, the polyalcohol is monomeric. In another embodiment, the polyalcohol is oligomeric or polymeric, such as, for example, a polyether polyol obtained by alkoxylation of a monomeric polyalcohol such as glycerin, trimethylolpropane, pentaerythritol, a sugar alcohol, a sugar or the like with one or more epoxides (oxiranes) such as ethylene oxide, propylene oxide, tetrahydrofuran or the like. Oligomers of glycerin or other monomeric polyalcohols may also be utilized. Mixtures of polyalcohols, including mixtures of two or more of the specific polyalcohols mentioned hereinabove, can be employed.

Suitable fatty acid triglycerides include any of the esters of glycerin wherein glycerin is fully esterified with one or more different types of fatty acids. The fatty acids may contain eight or more carbon atoms per molecule and may be linear (straight chain) or branched, saturated or unsaturated (including both mono- and polyunsaturated). In one embodiment of the invention, the fatty acids are selected from the group consisting of $C_{12}$-$C_{24}$ linear fatty acids (saturated and unsaturated; typically, at least a portion of the fatty acids are unsaturated). Illustrative examples of the fatty acids which may be present in the fatty acid triglycerides used to prepare the polyhydroxyl-functionalized transesterification product include caproic, caprylic, capric, lauric, myristic, palmitic, stearic, oleic, linoleic, linolenic, behenic, and erucic acid and mixtures thereof.

Natural oils and fats (e.g., fatty acid triglycerides derived from natural sources such as plants or animals) as well as modified natural oils and fats (such as, for example, fully and/or partially hydrogenated natural oils and fats) are utilized as the fatty acid triglyceride in one embodiment of the invention. The oil or fat may be liquid, solid or semisolid at room temperature. Illustrative oils and fats useful in the present invention include, but are not limited to, soybean oil, cottonseed oil, canola oil, peanut oil, corn oil, olive oil, rapeseed oil, safflower oil, sunflower seed oil, tallow, castor oil, linseed oil, fish oil, coconut oil, palm oil, palm kernel oil, tall oil and the like and fully and partially hydrogenated derivatives thereof.

The polyalcohol(s) and fatty acid triglyceride(s) are reacted for a time and at a temperature effective to achieve at least partial transesterification of the reactants wherein at least a portion of the fatty acid moieties present on the fatty acid triglyceride(s) are transferred to the polyalcohol(s) such that one or more of the hydroxyl groups on the polyalcohol are esterified with fatty acid. The relative ratios of the polyalcohol(s) and the fatty acid triglyceride(s) which are reacted may be adjusted so as to provide a transesterification reaction product wherein, on average, each molecule bears at least about two hydroxyl groups. Conditions effective to achieve such transesterification will be apparent to those skilled in the art, but typically reaction temperatures of from about 100 degrees C. to about 300 degrees C. and reaction times of from about 1 to about 12 hours are suitable. The transesterification may, if desired, be accelerated (increased in rate) and/or performed at a lower temperature by carrying out the reaction in the presence of a catalyst, including any of the conventional transesterification catalysts known in the art such as, for example, acids (e.g., sulfuric acid, phosphoric acid, sulfonic acids), bases (e.g., alkali metal and alkaline earth metal oxides and hydroxides such as potassium hydroxide, lithium hydroxide), organotin compounds (e.g., dibutyl tin dilaurate), and titanium compounds (e.g., titanium tetraisopropoxide, titanium tetrabutoxide). Typically, the catalyst is present at a concentration of from about 0.001 to about 0.1 percent by weight of the combined weight of fatty acid triglyceride(s) and polyalcohol(s). Following transesterification, the catalyst may be removed from the polyhydroxyl-functionalized transesterification product. The transesterification may be carried out under vacuum to facilitate the removal of water or other volatiles that may form. In one embodiment of the invention, the transesterification is carried out to completion. In other embodiments, however, the reaction of the starting materials is halted before transesterification is complete.

The polyhydroxyl-functionalized transesterification product may be prepared in a multi-step process where the first step involves the polyalcohol/fatty acid triglyceride reaction described hereinabove. In a further step, the initial product obtained may be combined with an additional portion of polyalcohol (which may be the same as or different from the polyalcohol used in the initial transesterification step) and the resulting blend subjected to further transesterification. Alternatively, in a further step the initial product obtained may be combined with one or more free fatty acids (or a lower alkyl ester of a fatty acid) and/or one or more dimer acids (i.e., dimerized unsaturated fatty acids) and the resulting blend subjected to conditions effective to react the fatty acid(s) with free hydroxyl groups of the initial product in an esterification reaction. The amount of free fatty acid used is preferably controlled such that the resulting product still contains an average of at least about two hydroxyl groups per molecule.

Typically, the polyhydroxyl-functionalized transesterification product will have an equivalent weight per hydroxyl group of from about 150 to about 300. The viscosity of the polyhydroxyl-functionalized transesterification product is typically from about 100 to about 500 cps at 25 degrees C.

The polyhydroxyl-functionalized transesterification product prepared as described hereinabove may be directly utilized as a constituent of Component B of the two component laminating adhesive of the present invention. For example, from about 1 up to 100 weight percent of Component B may be comprised of one or more such polyhydroxyl-functionalized transesterification products. Other isocyanate-reactive substances, such as those described in more detail below as well as other isocyanate-reactive substances known or conventionally used in two component laminating adhesives, may also be present, if so desired.

In one embodiment of the invention, Component B is comprised of a polyhydroxyl-functionalized urethane prepolymer derived from the aforedescribed polyhydroxyl-functionalized transesterification product. The preparation of such polyhydroxyl-functionalized urethane prepolymers is described in more detail below. The polyhydroxyl-functionalized urethane prepolymer typically has an equivalent weight per hydroxyl of from about 200 to about 600 and/or a viscosity of from about 300 to about 5000 cps at 25 degrees C. Typically, the urethane prepolymer contains, on average, at least about two hydroxyl groups per molecule. All or a portion (e.g., from about 1 to 100 percent by weight) of Component B may be comprised of one or more such polyhydroxyl-functionalized urethane prepolymers.

In yet another embodiment of the invention, Component B may be comprised of a polyhydroxyl-functionalized polyester (or mixture of such polyhydroxyl-functionalized polyesters) which is obtained from the aforementioned polyhydroxyl-functionalized transesterification products by reacting the transesterification products with one or more polybasic acids (especially dibasic acids) or reactive derivatives thereof (e.g., alkyl esters, anhydrides). Typically, the polyhydroxyl-functionalized polyester will have an equivalent weight per hydroxyl of from about 150 to about 600 and contain, on average, at least about two hydroxyl groups per molecule. The viscosity of the polyhydroxyl-functionalized polyester is typically from about 300 to about 30,000 cps at 25 degrees C. Other hydroxyl-containing compounds besides the transesterification products may optionally also be incorporated into the polyhydroxyl-functionalized polyester, as will be described in more detail subsequently herein. Such hydroxyl-functionalized polyesters may comprise all or only a portion of Component B of the laminating adhesive of the present invention (for example, about 1 to 100 weight percent of Component B may be comprised of such polyhydroxyl-functionalized polyester or a mixture of such polyesters).

Component A of the present invention contains at least one compound having two or more isocyanate groups per molecule. The isocyanate groups may be free —NCO groups, but can also be blocked or masked —NCO groups. One particular embodiment of the invention employs one or more isocyanate-functionalized polyurethane prepolymers in Component A. In the context of the present invention, a polyurethane prepolymer is a compound such as results, for example, from the reaction of a polyol component (such as the polyhydroxyl-functionalized transesterification product, a polyhydroxyl-functionalized polyester derived from the transesterification product, a polyhydroxyl-functionalized urethane prepolymer derived from the transesterification product or other active hydrogen-functionalized compound) with at least one isocyanate having a functionality of at least two. This reaction can take place without solvent or in a solvent, ethyl acetate, acetone or methyl ethyl ketone, for example. The term "polyurethane prepolymer" embraces not only compounds having a relatively low molecular weight, such as are formed, for example, from the reaction of a polyol with an excess of polyisocyanate, but also oligomeric or polymeric compounds. "Perfect" polyurethane prepolymers, containing a single polyol moiety capped at each end or terminus with a polyisocyanate moiety and very little, if any, free polyisocyanate monomer or oligomeric or polymeric compounds (containing two or more polyol moieties per molecule) may also be utilized.

Molecular weight figures based on polymeric compounds refer, unless otherwise indicated, to the numerical average of the molecular weight ($M_n$). The polyurethane prepolymers used in the context of the present invention generally may have a molecular weight of from 500 to 27,000, alternatively from 700 to 15,000, or alternatively from 700 to 8,000 g/mol.

Likewise embraced by the term "polyurethane prepolymers" are compounds as formed, for example, from the reaction of a trivalent or tetravalent polyol with a molar excess of diisocyanates, based on the polyol. In this case one molecule of the resultant compound bears two or more isocyanate groups.

Polyurethane prepolymers having isocyanate end groups are well known in the art. They can be crosslinked or chain-extended with suitable curing agents—usually polyfunctional alcohols—in a simple way to form substances of higher molecular weight. To obtain polyurethane prepolymers having terminal isocyanate groups it is customary to react polyfunctional alcohols with an excess of polyisocyanates, generally at least predominantly diisocyanates. In this case the molecular weight can be controlled at least approximately by way of the ratio of OH groups to isocyanate groups. While a ratio of OH groups to isocyanate groups of 1:1 or near to 1:1 often leads to substances with high molecular weights, it is the case with a ratio of approximately 2:1, for example, when using diisocyanates, that one diisocyanate molecule is attached on average to each OH group, so that in the course of the reaction, in the ideal case, there is no oligomerization or chain extension.

Excess unreacted polyisocyanate monomer may be removed from the polyurethane prepolymer reaction product initially obtained by any known method such as, for example, distillation to provide a prepolymer having a desirably low level of polyisocyanate monomer (e.g., less than 1 weight %).

Polyurethane prepolymers are customarily prepared by reacting at least one polyisocyanate, preferably a diisocyanate, and at least one component having functional groups which are reactive toward isocyanate groups, generally a polyol component, which is preferably composed of diols. The polyol component may contain only one polyol, although it is also possible to use a mixture of two or more polyols as the polyol component. By a polyol is meant a polyfunctional alcohol, i.e., a compound having more than one OH group in the molecule. By "functional groups which are reactive toward isocyanate groups" are meant, in the context of the present text, functional groups which can react with isocyanate groups to form at least one covalent bond.

Suitable reactive functional groups containing active hydrogen may be mono-functional in the sense of a reaction with isocyanates: OH groups or mercapto groups, for example. Alternatively, they may also be difunctional with respect to isocyanates: amino groups, for example. A molecule containing an amino group, accordingly, also has two functional groups which are reactive toward isocyanate groups. In this context it is unnecessary for a single molecule to have two separate functional groups that are reactive toward isocyanate groups. What is critical is that the molecule is able to connect with two isocyanate groups with the formation in each case of one covalent bond.

As the polyol component is possible to use a multiplicity of polyols, in addition to or instead of, the polyhydroxyl-functionalized transesterification product or a polyhydroxyl-functionalized derivative thereof (e.g., a polyhydroxyl-functionalized polyester or a polyhydroxyl-functionalized urethane prepolymer). These are, for example, aliphatic alcohols having from 2 to 4 OH groups per molecule. The OH groups may be both primary and secondary. Examples of suitable aliphatic alcohols include ethylene glycol, propylene glycol, butane-1,4-diol, pentane-1,5-diol, hexane-1,6-diol, heptane-1,7-diol, octane-1,8-diol and their higher homologs or isomers such as result in a formal sense from a stepwise extension of the hydrocarbon chain by one $CH_2$ group in each case or with the introduction of branches into the carbon chain. Likewise suitable are higher polyfunctional alcohols such as, for example, glycerol, trimethylolpropane, pentaerythritol and also oligomeric ethers of said substances with themselves or in a mixture of two or more of said ethers with one another.

As the polyol component it is additionally possible to use reaction products of low molecular weight polyfunctional alcohols with alkylene oxides, referred to as polyether polyols. The alkylene oxides have preferably 2 to 4 carbon atoms. Suitable examples are the reaction products of ethylene glycol, propylene glycol, the isomeric butanediols, hexanediols or 4,4'-dihydroxy-diphenylpropane with ethylene oxide, propylene oxide or butylene oxide, or with mixtures of two or more thereof. Also suitable, furthermore, are the reaction products of polyfunctional alcohols, such as glycerol, trimethylolethane or trimethylolpropane, pentaerythritol or sugar alcohols, or mixtures of two or more thereof, with the stated alkylene oxides to form polyether polyols. Particularly suitable polyether polyols are those having a molecular weight from about 100 to about 10,000, preferably from about 200 to about 5,000. Likewise suitable as the polyol component are polyether polyols such as are formed, for example, from the polymerization of tetrahydrofuran.

The polyethers may be synthesized using methods known to the skilled worker, by reaction of the starting compound having a reactive hydrogen atom with alkylene oxides: for example, ethylene oxide, propylene oxide, butylene oxide, styrene oxide, tetrahydrofuran or epichlorohydrin or mixtures of two or more thereof. Examples of suitable starting compounds are water, ethylene glycol, propylene 1,2-glycol or 1,3-glycol, butylene 1,4-glycol or 1,3-glycol, hexane-1,6-diol, octane-1,8-diol, neopentylglycol, 1,4-hydroxymethyl-cyclohexane, 2-methyl-1,3-propanediol, glycerol, trimethylolpropane, hexane-1,2,6-triol, butane-1,2,4-triol, trimethylolethane, pentaerythritol, mannitol, sorbitol, methylglycosides, sugars, phenol, isononylphenol, resorcinol, hydroquinone, 1,2,2- or 1,1,2-tris(hydroxyphenyl)ethane, ammonia, methylamine, ethylenediamine, tetra- or hexamethyleneamine, triethanolamine, aniline, phenylenediamine, 2,4- and 2,6-diaminotoluene and polyphenylpolymethylenepolyamines, such as are obtainable by aniline-formaldehyde condensation, or mixtures of two or more thereof.

Likewise suitable for use as the polyol component are polyethers which have been modified by vinyl polymers. Products of this kind are available, for example, by polymerizing styrene or acrylonitrile, or a mixture thereof, in the presence of polyethers.

Polyester polyols having a molecular weight of from about 200 to about 10,000 are likewise suitable as the polyol component. Thus, for example, it is possible to use polyester polyols formed by reacting low molecular weight alcohols, especially ethylene glycol, diethylene glycol, neopentyl glycol, hexanediol, butanediol, propylene glycol, glycerol or trimethylolpropane, with caprolactone. Likewise suitable as polyfunctional alcohols for preparing polyester polyols are 1,4-hydroxymethylcyclohexane, 2-methyl-1,3-propanediol, butane-1,2,4-triol, triethylene glycol, tetraethylene glycol, polyethylene glycol, dipropylene glycol, polypropylene glycol, dibutylene glycol and poly-butylene glycol.

Further suitable polyester polyols are preparable by polycondensation. For instance, difunctional and/or trifunctional alcohols can be condensed with a substoichiometric amount of dicarboxylic acids and/or tricarboxylic acids, or their reactive derivatives (e.g., anhydrides, esters), to form polyester polyols. Examples of suitable dicarboxylic acids are adipic acid or succinic acid and their higher homologs having up to 16 carbon atoms, unsaturated dicarboxylic acids such as maleic acid or fumaric acid, and also aromatic dicarboxylic acids, particularly the isomeric phthalic acids, such as phthalic acid, isophthalic acid or terephthalic acid. Examples of suitable tricarboxylic acids are citric acid or trimellitic acid. These acids may be used individually or as mixtures of two or more thereof. Particularly suitable in the context of the invention are polyester polyols formed from at least one of said dicarboxylic acids and glycerol which have a residual OH group content. Particularly suitable alcohols are hexanediol, ethylene glycol, 1,4-butanediol, diethylene glycol or neopentyl glycol or mixtures of two or more thereof. In one embodiment of the invention, a polyhydroxyl-functionalized transesterification product in accordance with the description provided previously in this application is utilized as at least one of the alcohols which is condensed with a di- and/or tricarboxylic acid or reactive derivative thereof to form a polyhydroxyl-functionalized polyester. Typically, the conditions used in such polycondensation reactions to form the polyhydroxyl-functionalized polyester will be similar to those previously described in connection with the reaction of polyalcohols with fatty acid triglycerides to form polyhydroxyl-functionalized transesterification products. To obtain hydroxyl end groups, an excess of hydroxyl equivalents relative to carboxyl equivalents is employed. Typically, hydroxyl: carboxyl equivalent ratios range from about 2:1 to about 15:14. The nearer this ratio is to unity, the higher the molecular weight of the polyhydroxyl-functionalized polyester will be. The extent of conversion of carboxylic acid groups (or equivalents thereof) to ester groups (as part of the polyester formed) is typically at least 99%, more preferably at least about 99.9%. Particularly suitable acids include isophthalic acid, orthophthalic acid anhydride and adipic acid and their mixtures. Particularly suitable di- and trifunctional alcohols which can be used in combination with the hydroxyl-functionalized transesterification product include ethylene glycol, ethylene glycol oligomers (e.g., diethylene glycol), polypropylene glycol, glycerin and mixtures thereof.

Besides the previously described polyhydroxyl-functionalized polyesters derived from the polyhydroxy-functionalized transesterification products previously described herein, polyester polyols of high molecular weight include, for example, the reaction products of polyfunctional alcohols, preferably difunctional alcohols (together where appropriate with small amounts of trifunctional alcohols) and polyfunctional carboxylic acids, preferably difunctional carboxylic acids. Instead of free polycarboxylic acids use may also be made (if possible) of the corresponding polycarboxylic anhydrides or corresponding polycarboxylic esters with alcohols having preferably 1 to 3 carbon atoms. The polycarboxylic acids may be aliphatic, cycloaliphatic, aromatic or heterocyclic or both. They may where appropriate be substituted, by alkyl groups, alkenyl groups, ether groups or halogens, for example. Examples of suitable polycarboxylic acids include succinic acid, adipic acid, suberic acid, azelaic acid, sebacic acid, phthalic acid, isophthalic acid, terephthalic acid, trimellitic acid, phthalic anhydride, tetrahydrophthalic anhydride, hexahydrophthalic anhydride, tetra-chlorophthalic anhydride, endomethylenetetrahydrophthalic anhydride, glutaric anhydride, maleic acid, maleic anhydride, fumaric acid, dimer fatty acid or trimer fatty acid or mixtures of two or more thereof. Where appropriate, minor amounts of monofunctional fatty acids may be present in the reaction mixture.

The polyesters may where appropriate contain a small fraction of carboxyl end groups. Polyesters obtainable from lactones, ε-caprolactone for example, or hydroxycarboxylic acids, ω-hydroxycaproic acid for example, may likewise be used.

Polyacetals and polyester ether polyols are likewise suitable as the polyol component. By polyacetals are meant compounds obtainable from glycols reacted with aldehydes, for example, diethylene glycol or hexanediol or a mixture thereof condensed with formaldehyde. Polyacetals which can be used in the context of the invention may likewise be obtained by the polymerization of cyclic acetals.

Further suitable polyols include polycarbonates. Polycarbonates can be obtained, for example, by reacting diols, such as propylene glycol, butane-1,4-diol or hexan-1,6-diol, diethylene glycol, triethylene glycol or tetraethylene glycol, or mixtures of two or more thereof, with diaryl carbonates, for example, diphenyl carbonate, or phosgene.

Likewise suitable as the polyol component are polyacrylates which carry OH groups. These polyacrylates are obtainable, for example, by polymerizing ethylenically unsaturated monomers which carry an OH group. Monomers of this kind are obtainable, for example, by esterifying ethylenically unsaturated carboxylic acids and difunctional alcohols, the alcohol generally being present in a slight excess. Examples of ethylenically unsaturated carboxylic acids suitable for this purpose are acrylic acid, methacrylic acid, crotonic acid or maleic acid. Corresponding esters carrying OH groups are, for example, 2-hydroxyethyl acrylate, 2-hydroxyethyl methacrylate, 2-hydroxypropyl acrylate, 2-hydroxypropyl acrylate, 2-hydroxypropyl methacrylate, 3-hydroxypropyl acrylate or 3-hydroxypropylmethacrylate or mixtures of two or more thereof.

In addition to the aforedescribed polyol compounds, polyisocyanates are important building blocks of the polyurethane prepolymers which can be used in Component A of the two component laminating adhesives of the present invention. These include compounds of the general structure $O{=}C{=}N{-}X{-}N{=}C{=}O$, where X is an aliphatic, alicyclic or aromatic radical, such as an aliphatic or alicyclic radical having from 4 to 18 carbon atoms.

As suitable polyisocyanates mention may be made, for example, of 1,5-naphthylene diisocyanate, 4,4'-diphenylmethane diisocyanate (MDI), hydrogenated MDI ($H_{12}$MDI), xylylene diisocyanate (XDI), tetramethylxylylene diisocyanate (TMXDI), 4,4'-diphenyldimethylmethane diisocyanate, di- and tetraalkylenediphenylmethane diisocyanate, 4,4'-dibenzyl diisocyanate, 1,3-phenylene diisocyanate, 1,4-phenylene diisocyanate, the isomers of tolylene diisocyanate (TDI), 1-methyl-2,4-diisocyanatocyclohexane, 1,6-diisocyanato-2,2,4-trimethylhexane, 1,6-diisocyanato-2,4,4-trimethylhexane, 1-isocyanatomethyl-3-isocyanato-1,5,5-trimethylcyclohexane (IPDI), chlorinated and brominated diisocyanates, phosphorus-containing diisocyanates, 4,4'-diisocyanatophenylperfluoroethane, tetramethoxybutane 1,4-diisocyanate, butane 1,4-diisocyanate, hexane 1,6-diisocyanate (HDI), dicyclohexylmethane diisocyanate, cyclohexane 1,4-diisocyanate, ethylene diisocyanate, bisisocyanatoethyl phthalate and also diisocyanates having reactive halogen atoms, such as 1-chloromethylphenyl 2,4-diisocyanate, 1-bromomethylphenyl 2,6-diisocyanate, 3,3-bischloromethyl ether 4,4'-diphenyl diisocyanate.

Sulfur-containing polyisocyanates are obtained, for example, by reacting 2 mol of hexamethylene diisocyanate with 1 mol of thiodiglycol or dihydroxydihexyl sulfide. Further diisocyanates which can be used are, for example, trimethylhexamethylene diisocyanate, 1,4-diisocyanatobutane, 1,12-diisocyanatododecane and dimer fatty acid diisocyanate. Particularly suitable are the following: tetramethylene, hexamethylene, undecane, dodecamethylene, 2,2,4-trimethylhexane, 1,3-cyclohexane, 1,4-cyclohexane, 1,3- or 1,4-tetramethylxylene, isophorone, 4,4-dicyclohexylmethane and lysine ester diisocyanates. In one embodiment of the invention, tetramethylxylylene diisocyanate (TMXDI) is utilized as the polyisocyanate.

Examples of suitable isocyanates having a functionality of at least three are the trimerization and oligomerization products of the polyisocyanates already mentioned above, such as are obtainable, with the formation of isocyanurate rings, by appropriate reaction of polyisocyanates, preferably of diisocyanates. Where oligomerization products are used, those particularly suitable have a degree of oligomerization of on average from about 3 to about 5.

Isocyanates suitable for the preparation of trimers are the diisocyanates already mentioned above, particular preference being given to the trimerization products of the isocyanates HDI, MDI or IPDI.

Likewise suitable for use are the polymeric isocyanates, such as are obtained, for example, as a residue in the distillation bottoms from the distillation of diisocyanates. Particularly suitable in this context is the polymeric MDI as is obtainable from the distillation residue during the distillation of MDI.

Component B of the two component laminating adhesive of the present invention contains at least one compound having two or more active hydrogens per molecule, wherein the active hydrogen functionalized groups are capable of reacting with the isocyanate functional groups in Component A. For example, the isocyanate-functionalized polyurethane prepolymers of Component A can be crosslinked or chain-extended with suitable active hydrogen-containing curing agents, generally polyfunctional alcohols or amines, to give substances of higher molecular weight (which can be linear and/or crosslinked in character). In one embodiment of the invention, the previously described polyhydroxyl-functionalized transesterification products and/or the previously described polyhydroxyl-functionalized polyesters derived from the transesterification products may be utilized as at least a portion of (in one embodiment, as the sole constituent of) Component B. Another type of active hydrogen-functionalized compound which can be used as Component B or as a portion of Component B are the hydroxyl-functionalized urethane prepolymers derived from the aforedescribed polyhydroxyl-functionalized transesterification product. Such hydroxyl-functionalized urethane prepolymers may be prepared by reacting one or more of the polyhydroxyl-functionalized transesterification products with a substoichiometric amount of a polyisocyanate (for example, a diisocyanate such as MDI or IPDI). Any of the polyisocyanates previously mentioned in connection with the synthesis of isocyanate-functionalized polyurethane prepolymers may be utilized for such purpose, with the reaction being carried out under any of the conditions known or typically used to react hydroxyl-functionalized substances with polyisocyanates. The prepolymers thus obtained contain at least one moiety derived from the polyisocyanate and at least two moieties derived from the polyhydroxyl-functionalized transesterification product, with urethane bonds formed between each polyisocyanate-derived moiety and each transesterification product-derived moiety as a result of the reaction between isocyanate groups in the polyisocyanate and hydroxyl groups in the polyhydroxyl-functionalized transesterification product. Each terminus of the prepolymer molecule generally bears a hydroxyl group, since the transesterification product is in stoichiometric excess relative to the polyisocyanate (i.e., the OH/NCO molar ratio is greater than 1).

Other examples of suitable active hydrogen-functionalized compounds suitable for use in Component B include the substances previously described herein as being suitable for reacting with polyisocyanates to form isocyanate-functionalized polyurethane prepolymers. "Active hydrogen-functionalized" as used herein refers to a functional group containing a hydrogen atom which, because of its position in the compound, displays significant activity according to the Zerewitnoff test described by Wohler in the Journal of the American Chemical Society, Vol. 49, p. 3181 (1927). Suitable active hydrogen-functionalized compounds also include those polymeric substances having about 2 to about 4 functional groups containing active hydrogen which are capable of reacting with isocyanate such as hydroxyl and primary or secondary amino groups. The active hydrogen-functionalized compound may have a number average molecular weight of from about 200 to about 100,000. In another embodiment, the molecular weight is from about 500 to about 50,000. Polyester polyols, polyether polyols, polyether ester polyols and mixtures thereof may be utilized. Examples of polyester polyols are those obtained by reacting dibasic acids such as terephthalatic acid, isophthalic acid, adipic acid, azaelaic acid and sebacic acid, dialkyl esters thereof and mixtures thereof with glycols such as ethylene glycol, propylene glycol, diethylene glycol, butylene glycol, neopentyl glycol, 2-methyl-1, 3-propanediol, 1,6-hexanediol and mixtures thereof. Polycaprolactone polyols may also be used. Exemplary polyether polyols include those obtained by polymerizing oxirane compounds such as ethylene oxide, propylene oxide, butylene oxide, oxirane and tetrahydrofuran using water or low molecular weight polyols such as ethylene glycol, propylene glycol, trimethylol propane or glycerin as an initiator. Copolymers of oxiranes (including random, block, and end-capped copolymers) are also suitable for use.

Examples of polyether ester polyols include those obtained by reacting polyether polyols with dibasic acids such as those mentioned herein above in connection with polyester polyols.

Low molecular weight polyhydroxy compounds having a number average molecular weight of less than 200 may also be used in Component B, either alone or conjointly with the aforementioned higher molecular weight polymeric polyols or polyhydroxyl-functionalized transesterification products or polyhydroxyl-functionalized polyesters or hydroxyl-functionalized urethane prepolymers derived therefrom. Suitable polyhydroxy compounds include ethylene glycol, propylene glycol, butylene glycol, diethylene glycol, dipropylene glycol, hexylene glycol, neopentyl glycol, cyclohexene dimethanol, glycerin and trimethylolpropane.

Specific mention may be made of the following active hydrogen-functionalized compounds suitable for use in Component B:

saturated and unsaturated glycols such as ethylene glycol or condensates of ethylene glycol, butane-1,3-diol, butane-1,4-diol, 2-butene-1,4-diol, 2-butyne-1,4-diol, propane-1,2-diol, propane-1,3-diol, neopentyl glycol, hexanediol, bishydroxymethylcyclohexane, dioxyethoxyhydroquinone, bis-glycol terephthalate, N,N'-di (2-hydroxyethyl)succinamide, N,N'-dimethyl-N,N'-di (2-hydroxy-ethyl)succinamide, 1,4-di(2-hydroxymethyl-mercapto)-2,3,5,6-tetrachlorobenzene, 2-methylene-propane-1,3-diol, 2-methylpropane-1,3-diol, 3-pyrrolidino-1,2-propanediol, 2-methylenepentane-2,4-diol, 3-alkoxy-1,2-propanediol, 2-ethylhexane-1,3-diol, 2,2-dimethylpropane-1,3-diol, 1,5-pentanediol, 2,5-dimethyl-2,5-hexanediol, 3-phenoxy- 1,2-propanediol, 3-benzyloxy-1,2-propanediol, 2,3-dimethyl-2,3-butanediol, 3-(4-methoxyphenoxy)-1,2-propanediol, and hydroxymethylbenzyl alcohol;

aliphatic, cycloaliphatic, and aromatic diamines such as ethylenediamine, hexamethylenediamine, 1,4-cyclohexylenediamine, piperazine, N-methylpropylenediamine, diaminodiphenyl sulfone, diaminodiphenyl ether, diaminodiphenyldimethyl-methane, 2,4-diamino-6-phenyltriazine, isophoronediamine, dimer fatty acid diamine, diaminodiphenylmethane, aminodiphenylamine or the isomers of phenylenediamine;

carbohydrazides or hydrazides of dicarboxylic acids;

amino alcohols such as ethanolamine, propanolamine, butanolamine, N-methylethanolamine, N-methylisopropanolamine, diethanolamine, triethanolamine, and higher di- or tri(alkanolamines);

aliphatic, cycloaliphatic, aromatic and heterocyclic mono- and diaminocarboxylic acids such as glycine, 1- and 2-alanine, 6-aminocaproic acid, 4-aminobutyric acid, the isomeric mono- and diaminobenzoic acids, and the isomeric mono- and diaminonaphthoic acids.

Component B may also comprise a hydroxy-functional natural oil or fat such as, for example, castor oil, and/or an epoxidized natural oil or fat which has been ring-opened with one or more alcohols.

The amounts of Component A and Component B used in the laminating adhesive systems of this invention will generally be adjusted so as to provide an NCO/active hydrogen equivalent ratio in the range of from about 1 to 10 in one embodiment of the invention, from about 1.05 to about 5 in another embodiment, and from about 1.1 to about 2 in yet another embodiment. Typically, the free isocyanate content (prior to any reaction between Component A and Component B) will be from about 1% to about 25% by weight based on the total weight of the two component adhesive.

Where appropriate, in addition to the isocyanate-functionalized compound(s) and active hydrogen-functionalized compound(s) previously described, the two component laminating adhesive of the invention may comprise one or more further additives. The additives may, for example, account for up to about 10% by weight of the overall two component adhesive.

The optional additives which can be used in the context of the present invention include solvents (although preferably the two component laminating adhesive is essentially free of solvent), water, adhesion promoters, catalysts, plasticizers, stabilizers, antioxidants, light stabilizers, fillers, dyes, pigments, fragrances, preservatives or mixtures thereof.

The film or films to be coated or adhered to each other using the two component formulations of the present invention may be comprised of any of the materials known in the art to be suitable for use in flexible packaging, including both polymeric and metallic materials as well as paper (including treated or coated paper). Thermoplastics are particularly preferred for use as at least one of the layers. The materials chosen for individual layers in a laminate are selected to achieve specific desired combinations of properties, e.g., mechanical strength, tear resistance, elongation, puncture resistance, flexibility/stiffness, gas and water vapor permeability, oil and grease permeability, heat sealability, adhesiveness, optical properties (e.g., clear, translucent, opaque), formability, merchantability and relative cost. Individual layers may be pure polymers or blends of different polymers. The polymeric layers are often formulated with colorants, anti-slip, anti-block, and anti-static processing aids, plasticizers, lubricants, fillers, stabilizers and the like to enhance certain layer characteristics.

Particularly preferred polymers for use in the present invention include, but not limited to, polyethylene (including low density polyethylene (LDPE), medium density polyethylene (MDPE), high density polyethylene (HPDE), high molecular weight, high density polyethylene (HMW-HDPE), linear low density polyethylene (LLDPE), linear medium density polyethylene (LMPE)), polypropylene (PP), oriented polypropylene, polyesters such as poly (ethylene terephthalate) (PET) and poly (butylene terephthalate) (PBT), ethylene-vinyl acetate copolymers (EVA), ethylene-acrylic acid copolymers (EAA), ethylene-methyl methacrylate copolymers (EMA), ethylene-methacrylic acid salts (ionomers), hydrolyzed ethylene-vinyl acetate copolymers (EVOH), polyamides (nylon), polyvinyl chloride (PVC), poly(vinylidene chloride) copolymers (PVDC), polybutylene, ethylene-propylene copolymers, polycarbonates (PC), polystyrene (PS), styrene copolymers, high impact polystyrene (HIPS), acrylonitrile-butadiene-styrene polymers (ABS), and acrylonitrile copolymers (AN).

The polymer surface may be treated or coated, if so desired. For example, a film of polymer may be metallized by depositing a thin metal vapor such as aluminum onto the film's surface. Metallization may enhance the barrier properties of the finished laminate. The polymer film surface may also be coated with anti-fog additive or the like or subjected to a pretreatment with electrical or corona discharges, or ozone or other chemical agents to increase its adhesive receptivity.

One or more layers of the laminate may also comprise a metal foil, such as aluminum foil, or the like. The metal foil will preferably have a thickness of about 5 to 100 µm.

The individual films comprising the laminates of the present invention can be prepared in widely varying thicknesses, for example, from about 5 to about 200 microns. The films, foils, and laminating adhesive formulation can be assembled into the laminate by using any one or more of the several conventional procedures known in the art for such purpose. For instance, the adhesive formulation may be applied to the surface of one or both of two films/foils by means of extrusion, brushes, rollers, blades, spraying or the like and the film/foil surfaces bearing the adhesive composition brought together and passed through a set of rollers (often referred to as nip rollers) which press together the film/foils having the adhesive composition between the films/foils. The resulting laminate may be rolled or wound onto a reel. The adhesive obtained by combining Components A and B may be applied by conventional techniques; e.g., by a multi-roll application station.

Typically, the rate at which the adhesive formulation is applied to the surface of a film or foil is in the range of about 0.2 to about 5 g/m². For example, the two components of the adhesive formulation may be pumped from separate drums or tanks at from about room temperature to about 40° C., mixed in the desired ratio using standard methods and equipment (for example, a meter-mix unit) and applied using solventless application machinery having the capability of being heated from about 25° C. to about 90° C. The adhesive composition of the present invention is utilized as a two component system wherein the two components are combined shortly before use. It may be desirable to heat the laminate at an elevated temperature (e.g., about 40° C. to about 100° C.) so as to accelerate full curing of the adhesive composition. Alternatively, the adhesive composition may be adjusted so as to be curable at approximately room temperature (e.g., about 20° C. to about 40° C.) over a period of from about 1 hour to about 7 days. Radiation may also be used to increase the cure rate of the adhesive.

Generally speaking, the adhesive compositions of the present invention are believed to be largely chemically cured through the reaction of the formulation constituents containing isocyanate groups and the constituents containing hydroxyl or other active hydrogen groups. However, curing can also be accomplished at least in part through moisture curing. Although sufficient moisture may be inherently present on the film or foil surfaces for this purpose, water may also be deliberately introduced through conventional methods if so desired.

Laminates prepared in accordance with the present invention may be used for packaging purposes in the same manner as conventional or known flexible laminated packaging films. The laminates are particularly suitable for forming into flexible pouch-shaped container vessels capable of being filed with a foodstuff and retorted. For example, two rectangular or square sheets of the laminate may be piled in the desired configuration or arrangement; preferably, the two layers of the two sheets which face each other are capable of being heat-sealed to each other. Three peripheral portions of the piled assembly are then heat-sealed to form the pouch. Heat-sealing can easily be accomplished by means of a heating bar, heating knife, heating wire, impulse sealer, ultrasonic sealer, or induction heating sealer.

The foodstuff is thereafter packed in the so-formed pouch. If necessary, gasses injurious to the foodstuff such as air are removed by known means such as vacuum degasification, hot packing, boiling degasification, or steam jetting or vessel deformation. The pouch opening is then sealed using heat. The packed pouch may be charged to a retorting apparatus and sterilized by heating to a temperature greater than about 100° C.

EXAMPLES

Example 1

A hydroxyl-functionalized transesterification product is obtained by reacting 1 mole soybean oil with 2 moles trimethylolpropane at 249 degrees C. for 2.5 hours in the presence of 0.0175 weight % tetraisopropyl titanate catalyst. The product obtained contains an average of about two hydroxyl groups per molecule and one fatty acid ester group per molecule (191 equivalent weight per hydroxyl group; viscosity 225 cps at 25 degrees C.).

Example 2

Example 1 is repeated using 1 mole soybean oil, 1 mole trimethylolpropane, and 1 mole pentaerythritol (4 hours at 249 degrees C.).

Examples 3a and 3b

The transesterification reaction of 1 mole soybean oil with 2 moles trimethylolpropane is carried out for 4 hours at 249 degrees C. in the presence of tetraisopropyl titanate. The reaction product thereby obtained is then reacted with 1 mole stearic acid (Example 3a) or 1 mole dimer acid (Example 3b). The polyhydroxyl-functionalized transesterification product produced in Example 3a has an equivalent weight per hydroxyl group of 283 and the polyhydroxyl-functionalized transesterification product produced in Example 3b has an equivalent weight per hydroxyl group of 420.

Example 4

The product of Example 1 (2 equivalents, based on hydroxyl) is reacted with diethylene glycol (2 equivalents) and adipic acid (2 equivalents) to produce a polyhydroxyl-functionalized polyester having an equivalent weight per hydroxyl group of 299 and a viscosity of 1088 cps at 25 degrees C.

Example 5

The product of Example 1 (4 equivalents, based on hydroxyl) is reacted with adipic acid (2 equivalents) to produce a polyhydroxyl-functionalized polyester having an equivalent weight per hydroxyl of 437 and a viscosity of 444 cps at 25 degrees C.

Example 6

Sunflower oil (1 mole) is reacted with trimethylolpropane (2 moles) under the conditions described in Example 2 to yield a polyhydroxyl-functionalized transesterification product having an equivalent weight of 191 per hydroxyl and a viscosity of 176 cps at 25 degrees C.

Example 7

The product of Example 1 (4 equivalents, based on hydroxyl) is reacted with MDI (0.5 equivalents, based on isocyanate) at 70 degrees C. to produce a hydroxyl-functionalized urethane prepolymer having an equivalent weight per hydroxyl of 237 and a viscosity of 740 cps at 25 degrees C.

Example 8

The product of Example 1 (4 equivalents, based on hydroxyl) is reacted with IPDI (1 equivalent, based on isocyanate) at 90 degrees C. to produce a hydroxyl-functionalized urethane prepolymer having an equivalent weight per hydroxyl of 293 and a viscosity of 2550 cps at 25 degrees C.

Example 9

Sunflower oil (1 mole) and glycerin (2 moles) are tranesterified for 4 hours at 249 degrees C. in the presence of tetraisopropyl titanate catalyst to yield a polyhydroxyl-functionalized transesterification product having an equivalent weight per hydroxyl of 178.

Example 10

Sunflower oil (1 mole) is reacted with trimethylolpropane under the conditions described in Example 2 to produce a polyhydroxyl-functionalized transesterification product having an equivalent weight of 191 per hydroxyl group and a viscosity of 176 cps at 25 degrees C. This product (6 equivalents, based on hydroxyl) is then reacted with orthophthalic acid anhydride (2 equivalents, based on carboxyl) to produce a polyhydroxyl-functionalized polyester having an equivalent weight of 296 per hydroxyl.

Example 11

Cottonseed oil (1 mole) is reacted with glycerin (2 moles) for 4 hours at 249 degrees C. in the presence of tetraisopropyl titanate catalyst to obtain a polyhydroxyl-functionalized transesterification product having an equivalent weight of 178 per hydroxyl.

Example 12

The product of Example 11 (4 equivalents, based on hydroxyl) is reacted with orthophthalic acid anhydride (1 equivalent, based on carboxyl) and adipic acid (1 equivalent) to produce a polyhydroxyl-functionalized polyester having an equivalent weight of 444 per hydroxyl.

Example 13

The product of Example 2 (2 equivalents, based on hydroxyl) is mixed with glycerin (3 equivalents, based on hydroxyl), adipic acid (1.5 equivalents, based on carboxyl), and orthophthalic acid anhydride (0.5 equivalents, based on carboxyl). The mixture is reacted at 239 degrees C. for 1 hour and then dried under 26 inches mercury vacuum. The resulting polyhydroxyl-functionalized polyester has an equivalent weight per hydroxyl of 182, an acid number of 3.0, and a viscosity of 26,000 cps at 25 degrees C. When cured with an isocyanate-functionalized urethane prepolymer containing 16 weight % NCO, a clear tough adhesive results.

Example 14

Soybean oil (1 mole) is reacted with glycerin (2 moles) for 4 hours at 249 degrees C. at 249 degrees C. in the presence of tetraisopropyl titanate to obtain a polyhydroxyl-functionalized transesterification product having an equivalent weight of 176 per hydroxyl.

Example 15

The product of Example 14 (2 equivalents, based on hydroxyl) and glycerin (3 equivalents, based on hydroxyl) are reacted at 239 degrees C. with adipic acid (0.5 equivalents, based on carboxyl) and orthophthalic acid anhydride (1.5 equivalents, based on carboxyl). After drying under vacuum, a polyhydroxyl-functionalized polyester is obtained having an equivalent weight of 188 per hydroxyl and a viscosity of 18,500 cps at 25 degrees C. The polyhydroxyl-functionalized polyester remained clear with no crystallization visible upon ageing and yielded a clear tough adhesive when cured with an isocyanate-functionalized urethane prepolymer containing 16 weight percent NCO.

Example 16

The product of Example 15 (2.132 equivalents, based on hydroxyl) is blended with castor oil (1.711 equivalents, based on hydroxyl). When 100 parts by weight of the resulting blend is cured with 170 parts by weight of an isocyanate-functionalized urethane prepolymer (16 weight % NCO), a clear cured adhesive is obtained giving destruct bonds between 0.5 mil metallized polyester (cured on the metallized side) to low density polyethylene (LDPE) film (2 mils thick) after 16 hours of curing.

Example 17 (Comparative)

Castor oil (100 parts by weight) is blended with 100 parts by weight of an isocyanate-functionalized urethane prepolymer (16 weight % NCO). The resulting blend is utilized to laminate the metallized side of a 0.5 mil metallized polyester film to 2 mil polyester film. Even after curing for 6 days, the adhesive does not stick to the metallized polyester film.

Example 18

The product of Example 15 (2 equivalents, based on hydroxyl), glycerin (3 equivalents, based on hydroxyl), and polypropylene glycol (2 equivalents, based on hydroxyl; 425 molecular weight) are reacted at 239 degrees C. with adipic acid (1.5 equivalents, based on carboxyl) and orthophthalic acid anhydride (1.5 equivalents, based on carboxyl). After drying under vacuum, a low viscosity polyhydroxyl-functionalized polyester is obtained having an equivalent weight of 266 per hydroxyl. When 100 parts by weight of this polyester are cured with 100 parts by weight of an isocyanate-functionalized urethane prepolymer (16 weight % NCO), the resulting adhesive strongly bonds a metallized PET film to a 2 mil LDPE film (100% of the metal on the surface of the PET film is pulled off the film after 2 days cure at 25 degrees C.).

Example 19

The polyhydroxyl-functionalized polyester of Example 18 (70 parts by weight) is blended with 30 parts by weight castor oil, yielding a blend having a viscosity of 980 cps at 25 degrees C. and an equivalent weight per hydroxyl of 150. The blend (100 parts by weight) is combined with 120 parts by weight of an isocyanate-functionalized urethane prepolymer (16 weight % NCO) and used as an adhesive to laminate the metallized side of 0.5 mil metallized polyester film to 2 mil LDPE film. After curing 2 days at 25 degrees C., 100% of the metal can be pulled off the polyester film (demonstrating that the adhesive bond formed is quite strong).

Example 20

Examples 14 and 18 are repeated, except that all the glycerin is added during the transesterification stage. The hydroxyl-functionalized transesterification product obtained therefrom is then combined with the polypropylene glycol and then reacted with orthophthalic acid anhydride and adipic acid as in Example 18 to yield a polyhydroxyl-functionalized polyester. After blending with castor oil as in Example 19, the polyester is cured with the isocyanate-functionalized urethane prepolymer to yield an adhesive exhibiting excellent adhesion to the surface of a metallized PET film.

Example 21

Examples 14 and 18 are repeated, except that all the glycerin and the polypropylene glycol are added during the transesterification stage together with the soybean oil. The hydroxy-functionalized transesterification product is then reacted with orthophthalic acid anhydride and adipic acid to produce a polyhydroxyl-functionalized polyester. After being blended with castor oil as in Example 19, the polyester is cured with the isocyanate-functionalized urethane prepolymer to yield an adhesive exhibiting excellent adhesion to the surface of a metallized PET film.

Example 22

The two component laminating adhesive of Example 19 is used in pilot laminator trials to prepare flexible film laminates using different film substrates as described in Table 1.

TABLE 1

| Structure | Day 1 Bond | Day 1 Heat Seal | Day 2 Bond | Day 2 Heat Seal | Day 6 Bond | Day 6 Heat Seal |
|---|---|---|---|---|---|---|
| PET/PE | 0.87 P | 6.60 B/SF | 3.28 SF | 14.51 E/SF | 1.43 SF | 16.59 E/SF |

TABLE 1-continued

| Structure | Day 1 Bond | Day 1 Heat Seal | Day 2 Bond | Day 2 Heat Seal | Day 6 Bond | Day 6 Heat Seal |
|---|---|---|---|---|---|---|
| OPP/PE | 1.11 SF | 5.89 B/SF | 1.08 SF | 10.42 SF | 1.26 SF | 10.49 SF |
| OPP/met-OPP | 0.72 SF | — | 1.14 SF | — | 1.20 SF | — |

PET = 48 gauge PET film
PE = 2 mil LDPE
OPP = 75 gauge oriented polypropylene film
Met-OPP = 75 gauge metallized polypropylene film
P = peel of laminate
SF = stock tear bonds
B/SF = delamination with stock fail bonds
E/SF = film elongation then stock failure

What is claimed is:

1. A two component laminating adhesive comprising Component A comprising at least one polyisocyanate-functionalized polyurethane prepolymer, and
Component B comprising at least one of (a) a polyhydroxyl-functionalized polyester derived by reacting a polyhydroxyl-functionalized transesterification product and at least one polybasic acid or alkyl ester or anhydride thereof and (b) a polyhydroxyl-functionalized urethane prepolymer derived from said polyhydroxyl-functionalized transesterification product,
wherein said polyhydroxyl-functionalized transesterification product is obtained by a process comprising transesterifying at least one polyalcohol containing at least three hydroxyl groups per molecule with at least one fatty acid triglyceride, and said polyhydroxyl-functionalized transesterification product has a viscosity of from about 100 to about 500 centipoise when measured at 25° C.

2. The two component laminating adhesive of claim 1 wherein said process comprises an additional step wherein an intermediate product obtained by transesterification is subsequently partially esterified with at least one free fatty acid or dimer acid.

3. The two component laminating adhesive of claim 1 wherein said fatty acid triglyceride is a natural fat or oil or a fully or partially hydrogenated natural fat or oil.

4. The two component laminating adhesive of claim 1, wherein Component B comprises said polyhydroxyl-functionalized urethane prepolymer obtained by reacting the polyhydroxyl-functionalized transesterification product with a substoichiometric amount of at least one polyisocyanate.

5. The two component laminating adhesive of claim 1, wherein said at least one polyalcohol is an aliphatic monomeric alcohol containing 3 to 5 hydroxyl groups per molecule.

6. The two component laminating adhesive of claim 1, wherein said at least one polyalcohol is selected from the group consisting of glycerol, trimethylolpropane, trimethylolethane, 1,2,6-hexanetriol, 1,2,4-butanetriol, pentaerythritol, sugars, alkyl glucosides and sugar alcohols.

7. The two component laminating adhesive of claim 1, wherein said polyhydroxyl-functionalized transesterification product contains an average of about two hydroxyl groups per molecule.

8. The two component laminating adhesive of claim 1, wherein Component B comprises said polyhydroxyl-functionalized polyester.

9. The two component laminating adhesive of claim 1, further comprising reacting the polyhydroxyl-functionalized transesterification product with at least one additional di- or trifunctional alcohol, and wherein the at least one polybasic acid is a dibasic acid.

10. The two component laminating adhesive of claim 1, wherein the polyhydroxyl-functionalized transesterification product is reacted with the at least one polybasic acid, selected from the group consisting of orthophthalic acid and adipic acid, and wherein the anhydride thereof is orthophthalic acid anhydride.

11. The two component laminating adhesive of claim 1, further comprising reacting the polyhydroxyl-functionalized transesterification product with at least one additional di- or trifunctional alcohol selected from the group consisting of ethylene glycol, ethylene glycol oligomers, polypropylene glycol, and glycerin wherein the at least one polybasic acid is selected from the group consisting of orthophthalic acid and adipic acid, and wherein the anhydride thereof is orthophthalic acid anhydride.

12. The two component laminating adhesive of claim 1, further comprising a hydroxy-functional natural oil or fat.

13. The two component laminating adhesive of claim 1 wherein the isocyanate portions of Component A consist of a compound on average having at least two isocyanato groups, bonded to an aliphatic, alicyclic or aromatic radical having from 4 to 18 carbon atoms.

14. The two component laminating adhesive of claim 1 wherein the polyhydroxyl-functionalized urethane prepolymer has an equivalent weight per hydroxyl of from about 200 to about 600, or a viscosity of from about 300 to about 5000 centipoise at 25° C., or both.

15. The two component laminating adhesive of claim 11, wherein the at least one polybasic acid is adipic acid.

16. The two component laminating adhesive of claim 8, wherein the polyhydroxyl-functionalized polyester exhibits no crystallinity.

17. The two component laminating adhesive of claim 1, wherein Component B is the polyhydroxyl-functionalized polyester.

* * * * *